United States Patent Office 3,509,469
Patented Apr. 28, 1970

3,509,469
POSITION SENSING DEVICE EMPLOYING MIS-ALIGNED MAGNETIC FIELD GENERATING AND DETECTING APPARATUS
Maxwell G. Strange, Fulton, Md., assignor to the United States of America as represented by the Administrator of the National Aeronautics and Space Administration
Filed May 17, 1967, Ser. No. 640,453
Int. Cl. G01n 27/00
U.S. Cl. 328—1  6 Claims

ABSTRACT OF THE DISCLOSURE

This invention is a position sensing device for sensing the position of a magnetic element. The magnetic element moves between a pair of fixed electromagnets—one a bar magnet connected to an oscillator and the other a horseshoe magnet connected to a phase detector through a limitig amplifier. The oscillator is also connected to the phase detector. The bar magnet is misaligned with the ends of the horseshoe magnet to create a bias voltage on the horseshoe magnet's output. When the magnetic element moves between the bar and horseshoe magnets it creates a phase shift in the output of the horseshoe magnet. This phase shift rapidly passes through zero at a well defined point. This point is detected by a phase detector and a pulse-forming network creates an output pulse.

BACKGROUND OF THE INVENTION

Figure 1:
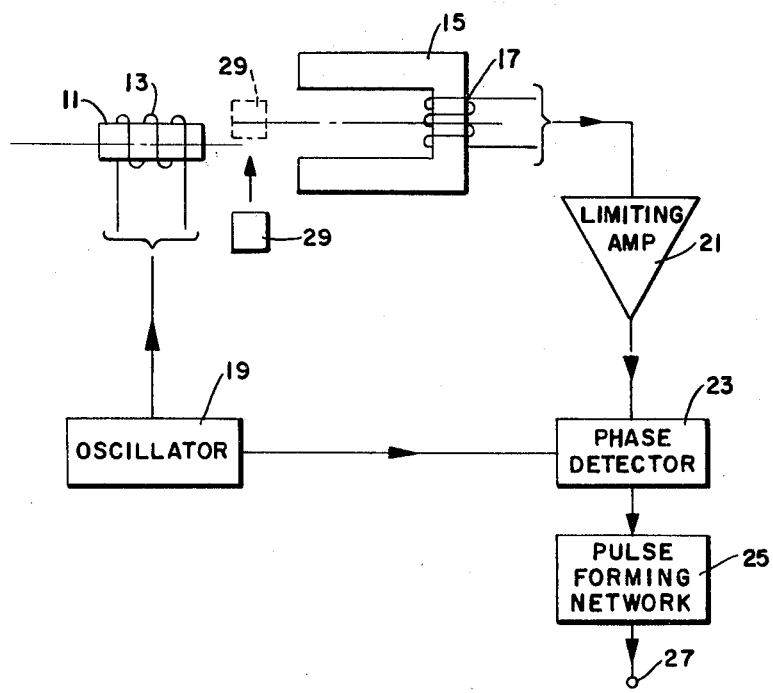

The invention described herein was made by an employee of the United States and may be manufactured and used by or for the Government for governmental purposes without the payment of any royalties thereon or therefor.

Generally, there are three types of electrical position sensing devices which do not require mechanically actuated contacts—optical, capacitive and magnetic. An optical position sensing device generally comprises a light source and a light detecting element. The element whose position is to be sensed either passes between the light source and the light detecting element or has a reflective element mounted on it that reflects light from the light source to the light sensing element when it reaches a predetermined position. Capacitive ensing devices comprise a pair of plates with the element to be sensed varying the capacitance between the plates when it passes between them. Magnetic sensing devices generally comprise a magnet or a pair of magnets connected to a signal generating means and a signal detecting means. The element to be sensed varies the magnetic field of the magnet or pair of magnets to vary the detected signal.

All three of the foregoing position sensing devices have found widespread use. However, their operation has not proven to be entirely satisfactory in many respects. Optical position sensing devices require light sources that consume a relatively large amount of power and are subject to deterioration and failure. Further, optical sensing devices require complete shielding against ambient light. Moreover, a high degree of resolution is difficult to obtain in a compact device.

Capacitive sensing devices are subject to misalignment, as well as failure due to dirt or other matter varying the capacitance between the plates and resulting in the generation of false outputs. Furthermore, considerable electronic circuitry is required.

Magnet sensing devices are limited due to noise pickup and lack of resolution. Also, the use of permanent magnets, as required by some magnetic devices, is often restricted in some environments such as on a spacecraft, for example.

Furthermore, simple magnetic sensors have outputs proportional to the rate-of-change of flux; this places a definite lower limit on the velocity of motion which can generate a useable pulse.

It is an object of this invention to provide a new and improved position sensing device.

It is another object of this invention to provide a new and improved position sensing device that is simple and reliable.

It is a further object of this invention to provide a new and improved position sensing device that senses very slowly moving elements and generates a sharp output when said element reaches a predetermined position.

It is still another object of this invention to provide a new and improved magnetic position sensing device which requires very little power for its operation.

It is yet another object of this invention to provide a new and improved magnetic sensing device that avoids the use of permanent magnets and minimizes radiated magnetic interference.

SUMMARY OF THE INVENTION

In accordance with a principle of this invention a new and improved magnetic position sensing device is provided. The device comprises a first magnet and a second magnet. The first magnet is separated from the second magnet and the magnetic axes of the magnets are misaligned. The ferrous element to be sensed passes between the misaligned magnets. The first magnet is connected to a frequency generating source and the second magnet operates as a pickup or sensor. The frequency generating source is also connected to a phase detector as is the output from the pickup magnet. As the item or element to be detected passes between the two magnets the phase detector's output signal changes in accordance with said passage. This change is due to a 180° phase shift between the phase detector's inputs, which occurs at a well defined position of the element.

In accordance with a still further principle of the invention, the output from the phase detector is applied to a pulse-forming network, and a pulse is generated when the element to be sensed reaches the position between the first and second magnets that creates the 180° phase shift.

It will be appreciated by those skilled in the art and others that the invention is inherently simple and reliable. It merely involves the use of a pair of magnets in combination with a frequency generating source and a phase detector. The magnets are misaligned to create a bias signal when the element to be sensed is not between the magnets. When the element to be sensed passes between the magnets the output of the phase detector varies due to a 180° phase shift. This phase reversal point is well-defined as a function of element position and is not dependent upon its velocity; hence, the position indication is sharp and accurate no matter how slowly the element is moving.

BRIEF DISCUSSION OF THE DRAWINGS

Figure 2:
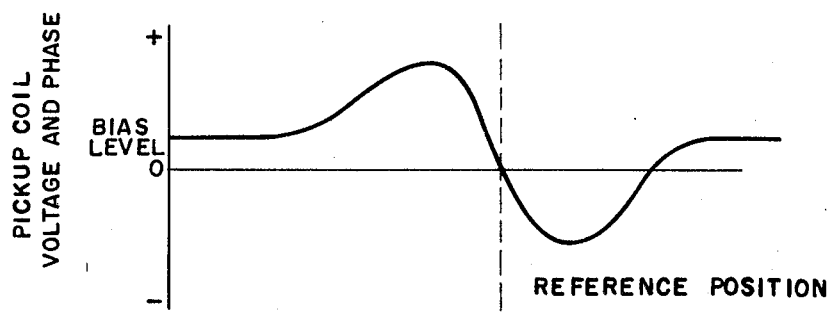

The foregoing objects and many of the attentive advantages of this invention will become more readily appreciated as the same becomes better understood by reference to the following detailed description when taken in conjunction with the accompanying drawings wherein:

FIG. 1 is a partially schematic and partially block functional diagram of a preferred embodiment of the invention; and FIG. 2 is a graph illustrating the output of the sensor as the element passes between the magnets.

DESCRIPTION OF THE PREFERRED EMBODIMENT

FIG. 1 is a partially schematic and partially block functional diagram of a preferred embodiment of the invention and comprises a bar magnet 11 having a coil 13, a horseshoe magnet 15 having a coil 17, an oscillator 19, a limiting amplifier 21, a phase detector 23, and a pulse forming network 25.

The oscillator 19 has two outputs; one output is connected to the coil 13 of the bar magnet 11, and the other output is connected to one input of the phase detector 23. The coil 17 of the horseshoe magnet 15 is connected to the input of the limiting amplifier 21, and the output of the limiting amplifier is connected to the second input of the phase detector 23. The output of the phase detector is connected to the input of the pulse forming network 25 and the output of the pulse forming network is connected to an output terminal 27.

The bar magnet 11 has one of its poles spaced from the poles of the horseshoe magnet 15 to create a passageway. However, the magnetic center line of the bar magnet along its longitudinal axis is displaced from the magnetic center line of the horseshoe magnet between its legs. That is, as illustrated in FIG. 1, the center line of the bar magnet is slightly below the center line of the horseshoe magnet.

Also illustrated in FIG. 1 is an element to be sensed 29 preferably formed of a magnetic material. The element 29 moves in the direction of the arrow through the passageway between the bar and horseshoe magnets.

FIG. 2 is a graph illustrating the output of the sensing coil on the horseshoe magnet as the element 29 moves between the magnets. As illustrated in FIG. 2, there is a bias voltage for the quiescent condition. That is, the oscillator 19 applies an AC signal to the winding 13 of the bar magnet 11; it applies to the same signal to one input of the phase detector 23. When the element 29 is not located in the passageway (illustrated as a solid line position in FIG. 1), the limiting amplifier detects a signal and applies it to the phase detector. The signal from the oscillator and from the limiting amplifier are, for example, in phase whenever the element 29 is well removed from the gap.

As the element 29 moves between the magnets, the output from the coil 17 starts to rise as illustrated in FIG. 2. After reaching a maximum, it starts to drop. When the element 29 reaches a predetermined position (illustrated as the dotted line position in FIG. 1), the output from the sensing coil 17 passes through zero. That is, the element reaches a null position in the passageway. Thereafter, the output increases in amplitude, but with reversed phase, as the element 29 continues to move upward through the gap. Finally, as element 29 moves away from the gap area, another phase reversal occurs and the output of the coil 17 returns to the bias level.

The limiting amplifier 21 removes all amplitude variations from the output of coil 17, preserving only the axis crossings shown in FIG. 2 as sharp phase reversals. The phase reversal results in an abrupt voltage shift at the phase detector output. Pulse forming network 25 determines the length and shape of the output pulse and blocks the normally extraneous positive-slope phase reversal, and, the network may be used to introduce a controlled degree of hysteresis.

The sensed or reference position is insensitive to the speed of the movement of the element. That is, element 29 can be rapidly moved between the magnets or it can be slowly moved. When it reaches its predetermined position the output from the limiting amplifier passes through an abrupt phase reversal and the pulse forming network generates an output pulse to indicate the position has been reached. Hence, in addition to being a basically simple position sensing device, the invention also has the advantage of sensing slowly moving elements.

While the foregoing has described the preferred embodiment of the invention, it will be appreciated by those skilled in the art and others that this is merely by way of example. The invention as illustrated in FIG. 1 uses a bar magnet and a horseshoe magnet. However, other magnet configurations can also be used. Generally, the invention requires the use of magnets having misaligned axes. The misalignment of the axes creates a bias output voltage for the quiescent condition. This bias level prevents extraneous signals from creating erroneous outputs. That is, if the magnet center lines were aligned, as provided by prior art magnet sensing devices, the output from the coil 17 would be zero in the absence of element 29 and the output from the phase detector would be indeterminate and very susceptible to noise or spurious signals. The simple expedient of biasing the output, as hereinabove described, insures a definite signal and phase condition at all times. Hence, the invention provides a high degree of noise immunity and simplifies the electronic circuitry necessary to sense the element's position. That is, if spurious or extraneous magnetic sources created false output signals an electronic system for eliminating these false signals would be required. The invention achieves the same result by simply misaligning the magnetic elements to create a bias level. Moreover, the misalignment does not require that the centerlines be parallel as illustrated in FIG. 1; any suitable configuration can be used.

Further, while the invention illustrated in FIG. 1 utilizes an oscillator to create an AC signal, it will be appreciated that this can be a rather unsophisticated, simple device. That is, its frequency can be relatively unstable since only phase differences are being sensed.

In some environments it may be advantageous to eliminate the limiting amplifier to provide an even simpler, less expensive device than that illustrated in FIG. 1. Moreover, it may be desirable to eliminate the pulse forming network and directly use the output from the phase detector. It is also possible to place all magnetic parts on the same side of the element. Hence, the invention may be practiced otherwise than is specifically described herein.

It will also be appreciated by those skilled in the art and others that the invention is useful in various environments. Specifically, the element 29 could be mounted on the rotor of a brushless DC motor; that is, a motor wherein a means is used to sense the position of the rotor. This sensed position is then used to control the energization of windings located on the motor's stator. Or, the invention could be used in a spacecraft with electronic measuring devices. That is, the invention could be used to sense the position of a directional measuring or scanning device to give meaning to the parameter being measured. Further, the invention could be used as a timing device by having a pendulum attached to the element. Each time the element moves between the magnets a pulse is generated. This pulse could be a timing or clock pulse for use in controlling other electronic circuitry. Therefore, it will be appreciated that the invention is suitable for use in numerous environments.

What is claimed is:

1. A magnetic position sensing device comprising:
   (a) first magnetic means having a coil for generating a magnetic field;

(b) second magnetic means having a coil for detecting a magnetic field and generating an output signal in response thereto, said first magnetic means separated from said second magnetic means with the magnetic centers of the magnetic means misaligned;

(c) signal generating means having first and second outputs for generating an electronic signal;

(d) phase detecting means having first and second inputs for detecting the phase difference between said output signal of the second magnetic means and said electronic signal and generating an output in response thereto;

(e) the first output of said signal generating means connected to the coil of said first magnetic means and the second output of said signal generating means connected to the first input of said phase detecting means; and (f) the coil of said second magnetic means connected to the second input of said phase detecting means.

2. Apparatus is claimed in claim 1 wherein said first magnetic means is a bar magnet and said second magnetic means is a horseshoe magnet.

3. Apparatus is claimed in claim 1 wherein said signal generating means is an oscillator.

4. Apparatus is claimed in claim 3 wherein said first magnetic means is a bar magnet and said second magnetic means is a horseshoe magnet.

5. Apparatus is claimed in claim 4 including a pulse forming network connected to the output of said phase detecting means.

6. Apparatus is claimed in claim 5 including a limiting amplifier connected between the coil of said horseshoe magnet and said phase detector.

References Cited

UNITED STATES PATENTS 3,058,059 10/1962 Bockemuehl _____ 324—41
3,395,341 7/1968 Malaquin _____ 324—70

JOHN S. HEYMAN, Primary Examiner
S. D. MILLER, Assistant Examiner

U.S. Cl. X.R.
328—5, 133; 307—309, 232; 324—41